United States Patent [19]

Sugimoto et al.

[11] Patent Number: 4,887,461
[45] Date of Patent: Dec. 19, 1989

[54] MAGNETOSTRICTION TYPE TORQUE SENSOR

[75] Inventors: Masaki Sugimoto, Yokosuka; Nobuteru Hitomi, Yokohama; Kenji Ikeura, Zushi; Hiroyuki Hirano; Kunihiko Morikawa, both of Fujisawa; Hisashi Kitahara; Kazuhiro Takatori, both of Yokosuka, all of Japan

[73] Assignee: Nissan Motor Co., Ltd, Yokohama, Japan

[21] Appl. No.: 211,259

[22] Filed: Jun. 24, 1988

[30] Foreign Application Priority Data

Jun. 26, 1987 [JP] Japan .................. 62-159006
Jul. 13, 1987 [JP] Japan .................. 62-174269
Jul. 15, 1987 [JP] Japan .................. 62-176441

[51] Int. Cl.$^4$ .............................................. G01L 3/02
[52] U.S. Cl. .................. 73/118.1; 73/862.36
[58] Field of Search .................. 73/826.36, 118.1; 74/856, 857, 862

[56] References Cited

U.S. PATENT DOCUMENTS 4,364,278 12/1982 Horter et al. ............... 73/862.36
4,506,554 3/1985 Blomkvist et al. ........... 73/862.36
4,550,618 11/1985 Kohama et al. ............. 73/862.36 X

FOREIGN PATENT DOCUMENTS 57-211030 12/1982 Japan .
59-77326 5/1984 Japan .
59-164931 9/1984 Japan .
59-166827 9/1984 Japan .
60-44839 3/1985 Japan .
61-127952 6/1986 Japan .
61-127953 6/1986 Japan .
667836 6/1979 U.S.S.R. .
838448 6/1981 U.S.S.R. .

Primary Examiner—Jerry W. Myracle
Attorney, Agent, or Firm—Foley & Lardner, Schwartz, Jeffery, Schwaab, Mack, Blumenthal & Evans

[57] ABSTRACT

A torque sensor for use in automotive transmissions includes first and second sets of grooves define first and second sets of elongate projections which are respectively subject to compression and elongation when the shaft in which they are defined, is subject to torque. Two yoked coils which are excited with an alternating current, are each disposed close to a set of projections. The compression and elongation of the projections changes the amount of magnetic flux which flows along the projections and therefore the inductance of the coils. The coils form part of a bridge circuit which is sensitive to the change in inductance in a manner which enables the amount of torque to be measured.

14 Claims, 8 Drawing Sheets

MAGNETOSTRICTION TYPE TORQUE SENSOR

BACKGROUND OF THE INVENTION

1. Field of the Invention

The present invention relates to torque sensors and more specifically to a type torque sensor which can detect the torque applied to a rotating body or the like, without direction connection or contact therewith and which type of sensor makes use of the so called magnetostriction phenomenon.

2. Description of the Prior Art

JP-A-61-127952 and JP-A-61-127953 disclose previously proposed torque sensors of the type which are front of contact with the rotating body in which the torque is being measured. In these prior art arrangements one or more sensor elements are disposed about the rotating body in a transmission case and secured to ribs flanges or the like of the casing by way of screws or the like.

These sensor arrangements are arranged to project from their mounting sites and juxtapose the peripheral outer surface of the shaft in which torque is to be sensed and to include U shape cores on which exciting and measuring coils are wound.

However, these devices have suffered from the drawback that as they are exposed to only a portion of the rotating shafts they tend to be subject to "eccentricity" noise which is generated when the shaft is subject to the application of torque which induces twisting deformation and causes the portion of the shaft to which the sensor is exposed to become momentarily eccentric.

A further drawback comes in that the voltage output signal of the device is relatively low. To overcome this is necessary to increase the number of windings on the sensing and exciting coils. However, this measure results in the size of the sensor being unacceptably increased to the point wherein disposal in the confines of a transmission case becomes very difficult.

Yet another drawback has come in that the arrangements disclosed in the above mentioned documents have made made use of an amorphous permeable membrane in the form of a ribbon having a thickness of about 20–30 μm and which is fixed by way of a heat resistant bond to the peripheral surface of the shaft in a manner to juxtapose the U shaped cores.

This construction while being intended to facilitate the production of the sensor arrangement has incurred the drawback that there is a difference in the coefficient of expansion of the membrane and the shaft on which the membrane is disposed. Accordingly, when the temperature of the shaft changes the temperature characteristics of the device are impaired in manner which leads to a notable reduction in the accuracy of the sensor unless extreme care and pains are taken when bonding the membrane in place. Accordingly, this provision has in fact had the effect of increasing the number of operations necessary to secure the membrane in place and has notably reduced the productivity of the device.

SUMMARY OF THE INVENTION

It is an object of the present invention to provide a torque sensor of the type which makes use of the so called magnetostriction phenomenon (viz., the dependance of the state of strain of a ferromagnetic sample on the direction and extent of magnetization), which is compact and produces a signal which accurately reflects the torque being applied to a rotating body, which is compact and light and can be disposed in locations devices such as clutch housings and the like wherein space is at premium and the environment relatively hostile.

In brief, the above object is achieved by an arrangement wherein a torque sensor for use in automotive transmissions comprises first and second sets of grooves which are formed in a shaft of the transmission which define first and second sets of elongate projections therebetween. The projections are angled with respect to each other in a manner to be respectively subject to compression and elongation when the shaft in which they are defined, is subject to torque. Two yoked coils which are excited with an alternating current, are each disposed close to a set of projections. The compression and elongation of the projections changes the amount of magnetic flux which flows along the projections and therefore the inductance of the coils. The coils form part of a bridge circuit which is sensitive to the change in inductance in a manner which enables the amount of torque to be measured.

More specifically, the present invention comprises a torque sensor for use in an automotive transmission comprising: a shaft, said shaft forming part of the gear train of said transmission; means defining a first set of grooves in a surface of said shaft, said first grooves defining a plurality of first projections therebetween, said first grooves and said first projections being arranged at a first predetermined angle with respect to the axis of rotation of said shaft, said first projections undergoing one of compression and elongation when a torque is applied to said shaft, a first coil, said first coil being mounted so as to juxtapose said first set of grooves, said first coil being operatively connected with a control circuit which includes a source of alternating current; means defining a second set of grooves in a surface of said shaft, said second set of grooves defining a plurality of second projections which are arranged at a second predetermined angle with respect to the axis of rotation of said shaft, said second projections undergoing the other of compression and elongation when said torque is applied to said rotatably body; a second coil, said second coil being mounted so as to juxtapose said second set of grooves, said second coil being connected with said control circuit; said first and second set of projections are magnetically permeable and such that when subject to compression the permeablity is reduced and the amount of magnetic flux which passes therethrough is reduced, and when subject to elongation the permeability is increased and the amount of magnetic flux which passes therethrough is increased.

DETAILED DESCRIPTION OF THE PREFERRED EMBODIMENT

Figure 1:
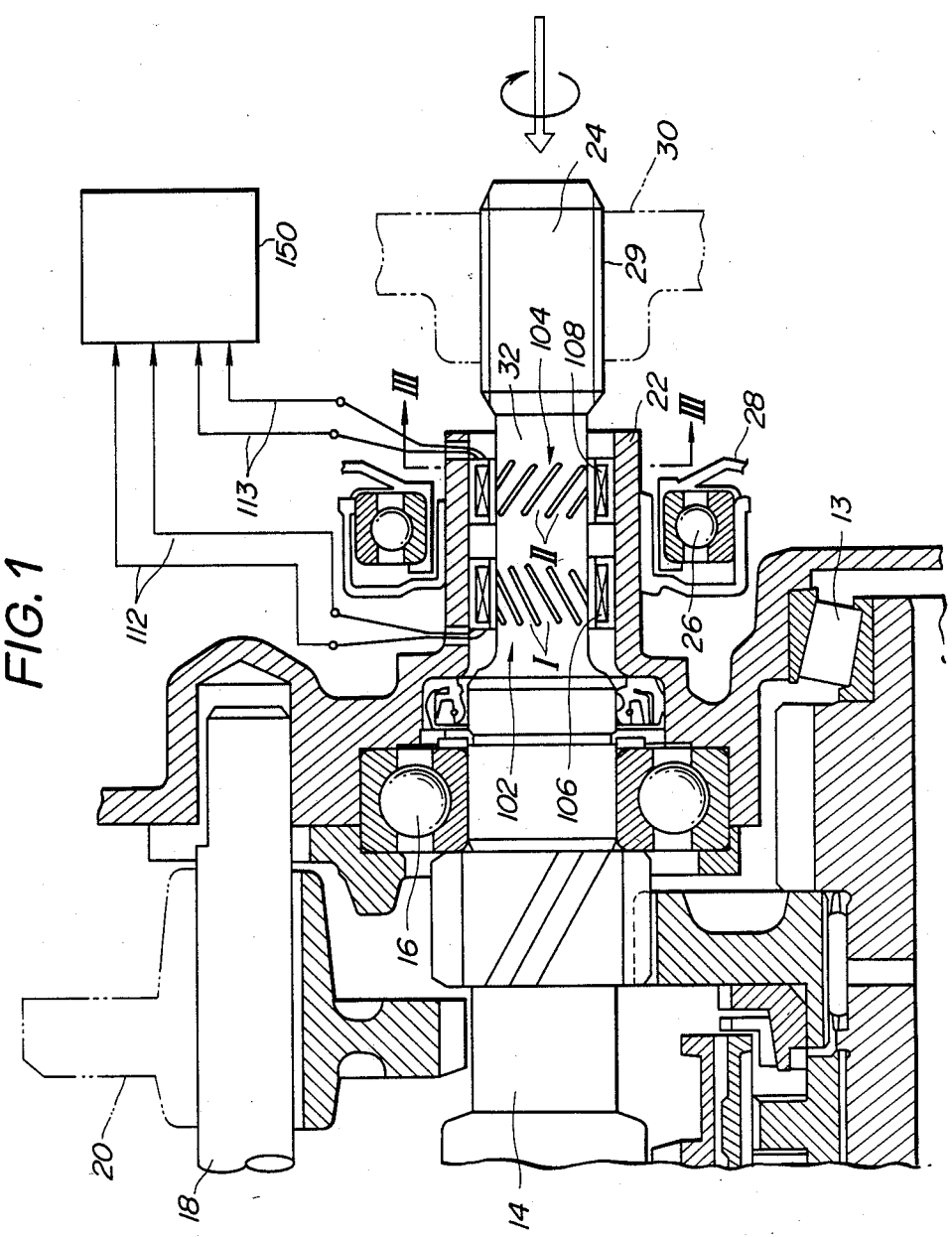
FIG. 1 of the drawings shows in sectional elevation the arrangement which characterizes a first embodiment of the present invention.
Figure 2:
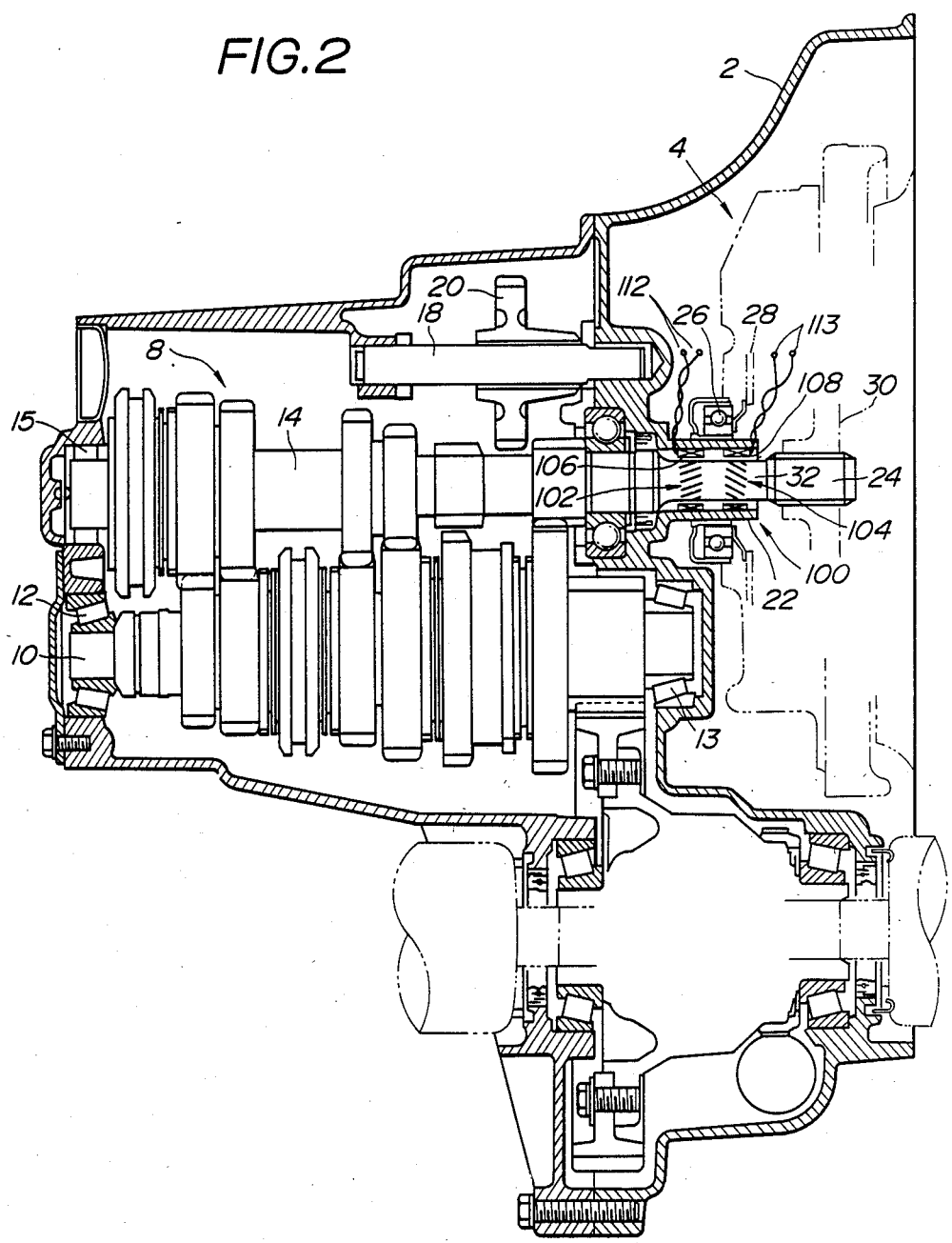
FIG. 2 is a view similar to that shown in FIG. 1 but which shows increase detail of the transaxle in which the embodiment of the invention is disposed.
Figure 3:
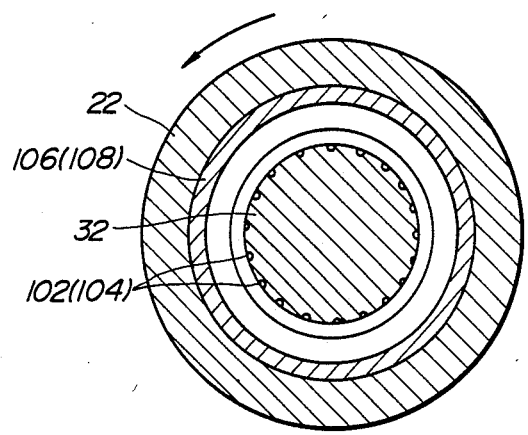
FIG. 3 is a sectional view as taken along section line III—III of FIG. 1.

FIGS. 1 and 2 show details of a transaxle arrangement in which a first embodiment of the inventive torque sensor is used.

As best seen in FIG. 2 the torque sensor 100 according the first embodiment of the present invention is disposed in a transaxle arrangement which basically comprises a clutch housing 2 in which a clutch 4 is housed, a transmission case 6 in which a transmission 8, in this instance a manual countershaft synchromesh type, is operatively disposed.

The transmission includes a mainshaft 10 which is supported in the transmission housing by tapered roller bearings 12, 13; an input shaft 14 which is supported by bearings 15, 16; a reverse idler gear shaft 18; a reverse idler gear 20 which is rotatably supported on the just mentioned shaft; and a differential gear.

As the construction and arrangement of these elements are well known in the automotive art and has no limiting effect on the present invention, no further disclosure of the same will be given.

The clutch 4 takes the form of a manually operated unit which is supported on a tubular-like extension 22 formed in the clutch housing 2. In this instance the tubular-like extension 22 is formed of a magnetically permeable material such as Cr-Mo type alloy steel or the like. The reason for this will become more clearly understood hereinlater.

A clutch shaft 24 is arranged to pass through the tubular-like extension 22 while the clutch release bearing 26 is mounted on the external periphery thereof. The release bearing 26 is operatively connected with a manually operable clutch pedal by way of a release fork (neither shown). The clutch diapragm spring 28 is arranged with respect to the release bearing 26 in the manner illustrated in phantom. As will be appreciated, the clutch shaft 24 in this instance is formed as an extension of the transmission input shaft 14. One end of the clutch shaft 24 is formed with a gear section 29 on which the clutch hub 30 is operatively mounted.

Figure 5:
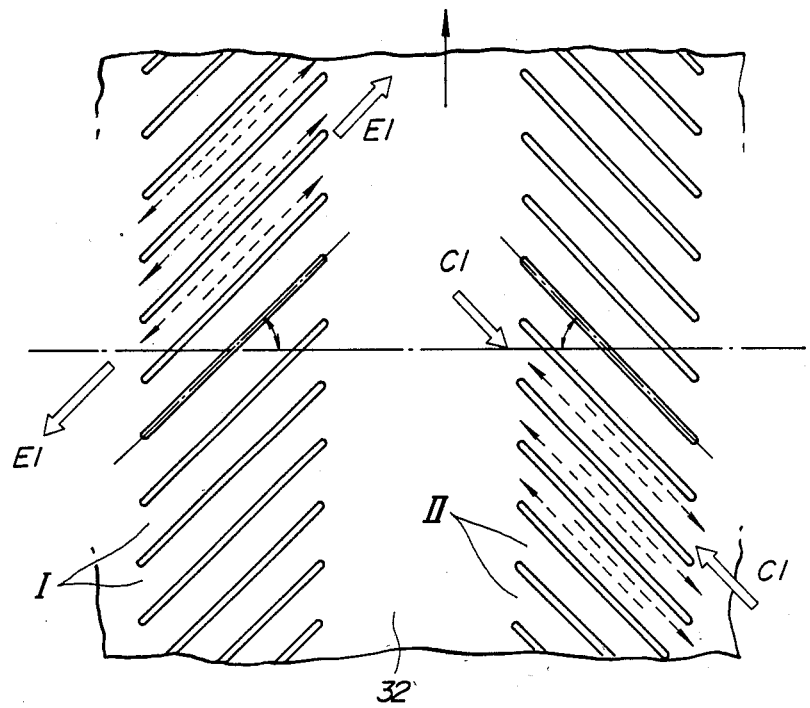
FIG. 5 is a drawing showing the groove arrangement which forms a vital part of the instant invention.

The torque sensor 100 which characterizes the instant invention comprises first and second sections. The first section is formed on the outer peripheral surface of a neck section 32 of the clutch shaft 24 which is enclosed within the tubular-like extension 22. The second section is disposed on the inner periphery of the tubular-like extension 22. In the instant embodiment the first section includes two sets of grooves 102 and 104 which as best seen in FIG. 5 are formed in a mirror image arrangement with respect to one and other and at an angle of 45 degrees with respect to the rotational axis of the clutch shaft 24.

As the grooves 102, 104 are formed in the external surface of the clutch shaft 24 direct machining of the shaft is rendered easy. However, if so desired it is within the scope of the instant invention to form the grooves by aperturing a suitable ribbon like membrane and securing this to the shaft using a suitable adhesive.

With this latter mentioned variant event through a slight amount of stress is produce in the membrane when it is curled and disposed in place on the clutch shaft, and even though the temperature characteristics of the bond are apt to change the output of the sensor even when there is no change in temperature, the arrangement of the grooves in accordance with the invention is such as to inherently obviate these changes and render any special consideration in connection therewith uncessary.

The second section of the sensor comprises first and second coil arrangements 106, 108. In this embodiment the coils are wound on bobbins (no numerals), the radial side flanges of which function as yokes. The bobbins which can be formed integrally or individually are disposed with the tubular-like extension 22 in a manner wherein the yokes closely juxtapose the first and second sets of grooves 106, 108. In order to reduce magnetic reluctance the yokes are arranged as close as is practical to the external peripheral surface of the shaft neck 32.

The coils 106, 108 are operatively connected with a circuit arrangement denoted by the numeral 150. In this arrangement the connections are provided by sets of lead lines 112, 113 which arranged to pass through radial bores formed in the tubular-like extension 22.

As mentioned above the first and second sets of grooves 106, 108 are arranged in a mirror image configuration with one and other and at predetermined angles +theta and —theta, respectively. The grooves have the same predetermined depth, width and length. |theta| =45 degrees with respect to the longitudinal axis of the shaft 24.

Projection section I and II are defined between the grooves.

The importance of these will become more clearly appreciated hereinlater.

Figure 4:
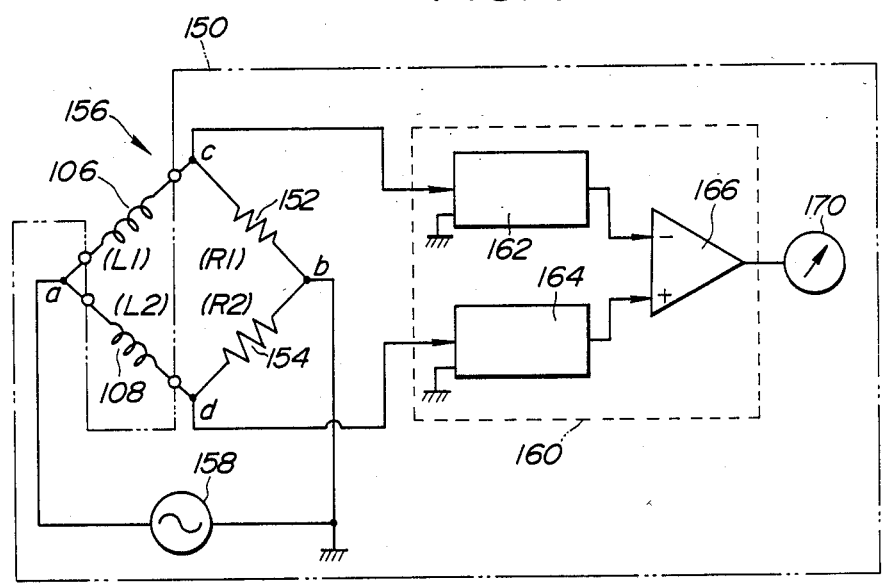
FIG. 4 is a circuit diagram showing a circuit arrangement which is used in connection with the instant emodiment.

FIG. 4 shows a circuit arrangement which is used in connection with the instant embodiment. This circuit is such that coils 106 and 108 are circuited with resistances 152, 154 (having resistances R1 and R2 respectively) in a manner to define a bridge circuit 156. This bridge circuit 156 30 has four terminals a–d. In this arrangement terminals a and b are connected across a source of alternating current 158 while terminals C and D are connected with a logic circuit 160. The alternating current source 158 (oscillator or the like) is arranged to produce signal having a frequency of 10–30 KHz.

The logic circuit 160 includes first and second rectifier circuits 162, 164 and a differential amplifier 166. As shown, rectifier circuit 162 is connected to the negative input of the amplifier 166 while rectifier 164 is connected the postive input thereof. The output of the differential amplifier 166 is supplied to a suitable device 170 which displays or otherwise makes use of the data supplied thereto. Merely by way of example, in automotive applications, the output of the differential amplifier 40 can be supplied to a "black box" which controls the supply of fuel, ignition timing, the shift timing (in the case of an automatic transmission) and the like.

In the instant embodiment the inductances L1 and L2 of the coils 106 and 108 are arranged to be equal. The values of resistances R1 and R2 are selected to reduce the output of the bridge circuit 156 to zero under conditions wherein torque is not applied.

Figure 6:
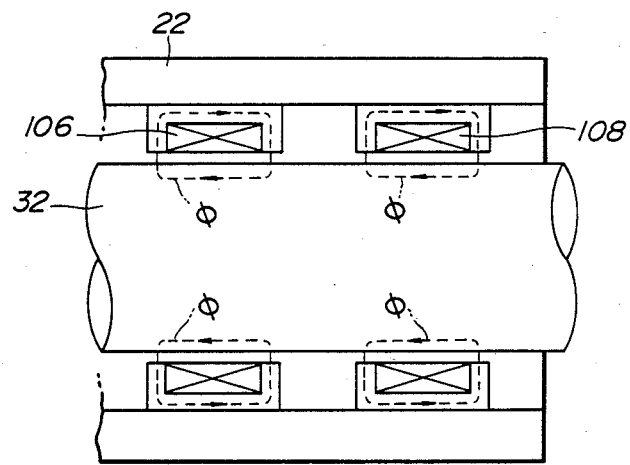
FIG. 6 is a schematic elevation showing the magnetic circuits which are produced with the first embodiment.
Figure 7:
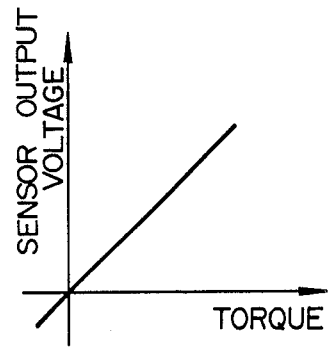
FIG. 7 is a graph showing the output characteristics of the first embodiment in terms of torque and output voltage.

In operation the above described embodiment is such that when the engine is running, and the clutch pedal is depressed in a manner wherein torque is not applied through the clutch to the clutch shaft 10, and the alternating current source 158 in control circuit 150 is ON, the first and second coils 106 and 108 are supplied with alternating current and magnetic circuits are established in the manner indicated by broken line in FIG. 6. Viz., in the case of coil 106 magnetic flux (phi) cycles through the radial flange members which define the yokes, the gaps between the yokes and the shaft neck 32, the upper surface of the neck, and the base portion of the bobbins. In this instance the magnetic flux (phi) undergoes a skin effect. Viz., an effect wherein alternating currents tend to flow near the surface of a conductor and thus being restricted to a small part of the total cross sectional area and producing the effect of increasing the resistance.

Accordingly, in accordance with this skin effect the magnetic flux is forced to flow along the projection sections I and II and thus establish a magnetic configuration anisotropy. As the shaft neck 32 is not subject to any torque the amount of stress which is produced in the same is essentially zero and the distortion thereof is such that the amount of stress in the projection sections I and II is essentially zero.

Under these conditions the inductances L1=L2 the voltages appearing on the terminals c and d of the bridge circuit 30 assume the same magnitude. Accordingly, the differential amplifier outputs a zero level signal.

When a torque is applied to the shaft 1 the projection portions I and II undergo linear deformation which changes the permeability ratio thereof. Viz., in the instant embodiment, when the shaft neck 32 is subject to torgue, the resulting twisting of the clutch shaft 24 causes one set of projection portions to undergo elongation and the other set to undergo compression. The amount of magnetic flux (phi) (shown by broken lines) in the compressed projection members reduces while that in the elongated ones increases. This changes the value of the inductances L1 and L2 and induces the voltages appearing on terminals c and d to change change accordingly.

By way of example, when torque is applied in a manner to flow from a first end of the shaft neck 32 to the other and cause the same to rotation in a first rotational direction—viz., engine torque is supplied through the clutch shaft 24 to the transission, the projection portions I are compressed (as shown by arrows C1) and the projection portions II are elongated (as shown by arrows E1), L1 reduces while L2 increases.

This results in the balance of the bridge circuit 156 being broken in a manner wherein the c–b voltage increases as compared with the d–b voltage. Accordingly, the strength of the signal applied to rectifier circuit 162 increases as compared with circuit 164. The positive imbalance is converted into a signal indicative of the same by the differential amplifier 166.

Conversely, when torque is applied in a manner to flow from second end of the shaft neck 32 to the first one while rotating the same direction as in the above example—viz., the vehicle decelerates under engine braking or the like and torque is induced to flow back through the transmission input shaft and clutch shaft 24 to the clutch 4, the reverse situation wherein elongation and compression of the projection portions I and II occurs with the corresponding reverse results. This of course induces the situation wherein the strength of the signal fed to rectifier circuit 162 increases as compared with that of rectifier 164. This negative imbalance is converted by the differential amplifier 166 into the appropriate output signal indicative thereof.

The first embodiment exhibits a number of advantages over the prior art. Viz., as the sensor arrangement is enclosed within the tubular-like extension 22 it inherently tends to be shielded from external influences and noise. Further, the arrangement permits noise due to eccentricity to be averaged out by the subtracting nature of the arrangement and thus greatly reduces the possiblity of error.due to this phenomenon.

In addition to this production of the arrangement is simple in that it consists of only two major elements—the two sets of grooves and the two coils arrangements.

The arrangement of grooves enables the rotational direction and/or the direction of the torque flow to be readily discerned while the internal disposure renders it possible to provide gears and the like (e.g. the clutch release bearing) on the external surface. This of course enables highly compact arrangements to be constructed and utilized in locations wherein space is extremely limited.

ALTERNATIVE EMBODIMENTS

Figure 8:
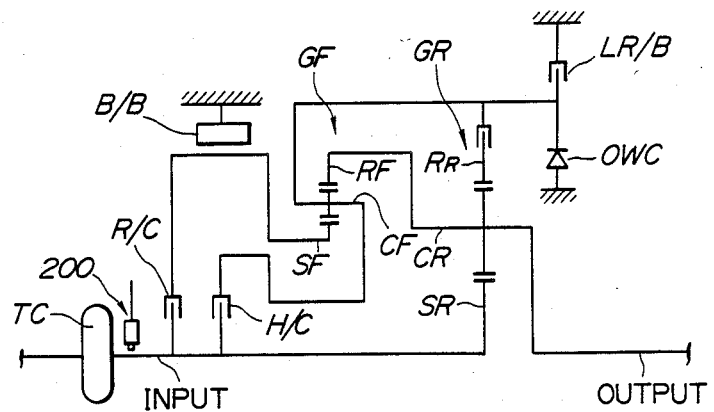
FIG. 8 is a diagram showing the gear train of a planetary gear to which second, third and fourth embodiments of the present invention are applied.

FIG. 8 shows a planetary gear train of a transmission to which second to fourth embodiments of the present invention are applied.

In this particular transmission the input shaft is connected to a prime mover such as an internal combustion engine through a torque conveter/lock-up clutch arrangement generally denoted TC.

The transmission includes three clutches and two brakes— a reverse clutch R/C, a high clutch H/C and a low clutch L/C, a band brake B/B and a low and reverse brake LR/B. A one-way clutch OWC is connected with the low and reverse brake LR/B and the carrier of a first planetary gear unit GF. The low clutch L/C is arranged to connect the just mentioned carrier and the ring gear of a second planetary gear unit GR when engaged.

This tranmission is capable of producing four forward speeds and one reverse in accordance with the selective engagement of the above mentioned friction elements.

However, it should be noted that the application of the instant invention is not necessarily limited to this type of transmission and can be advantageously applied to other arrangements.

SECOND EMBODIMENT

Figure 9:
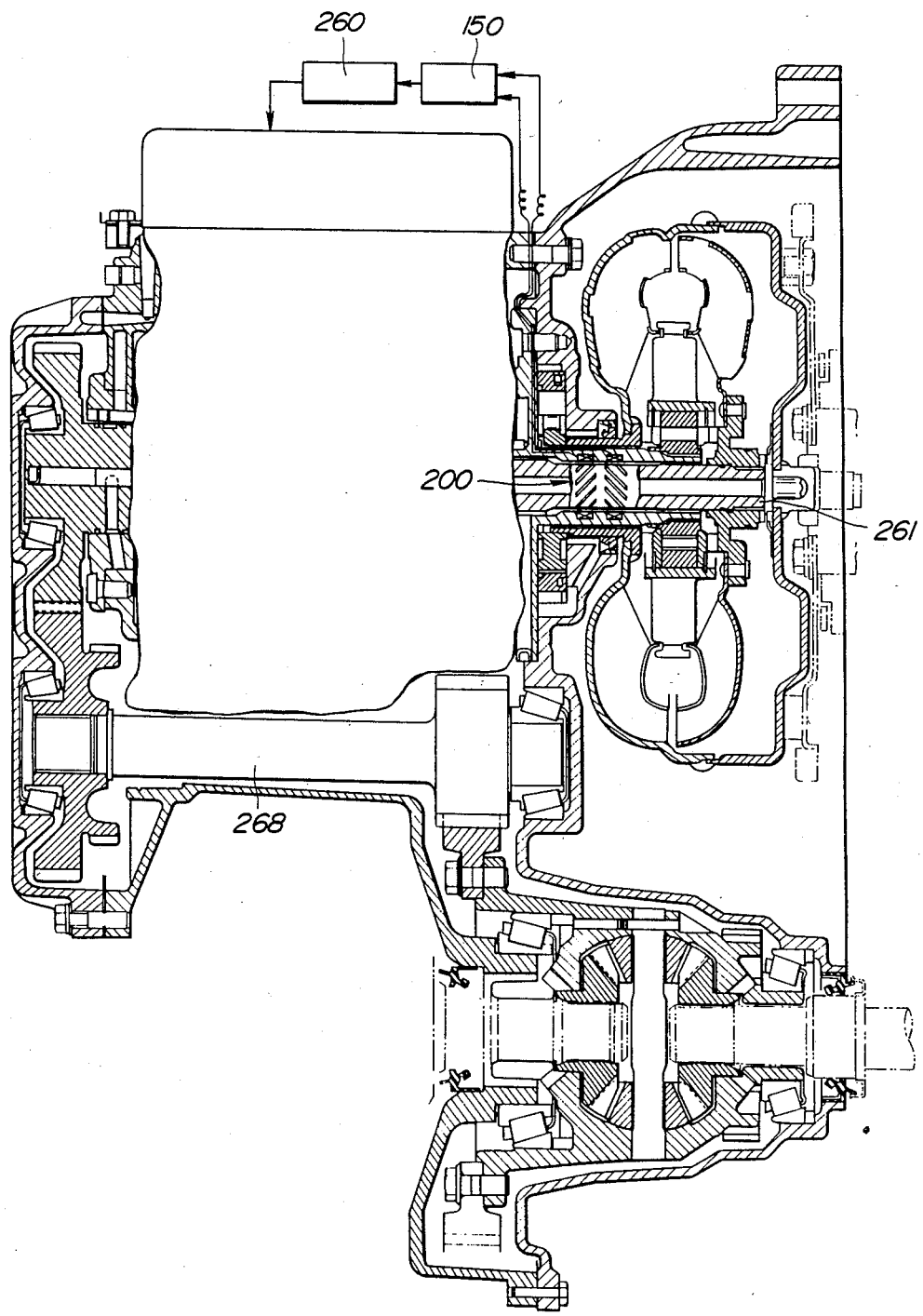
FIG. 9 is a sectional elevation of an automtatic transaxle which is equipped with a second embodiment of the present invention.

FIG. 9 shows the disposition of the second embodiment of the present invention. In this arrangement the torque sensor 200 is disposed on a torque converter input shaft 201 in a manner essentially similar to the first embodiment. It will be noted that in this instance the output of the sensor circuit 150 is supplied to a transmission control circuit 260 used in connection with the control the transmission. Viz., by being able to accurately detect the torque in the input shaft of the torque conveter arrangement, shift decisions with respect to the engine load etc., are facilitated in a manner which enables the attenuation of shift shock and the like.

Figure 11:
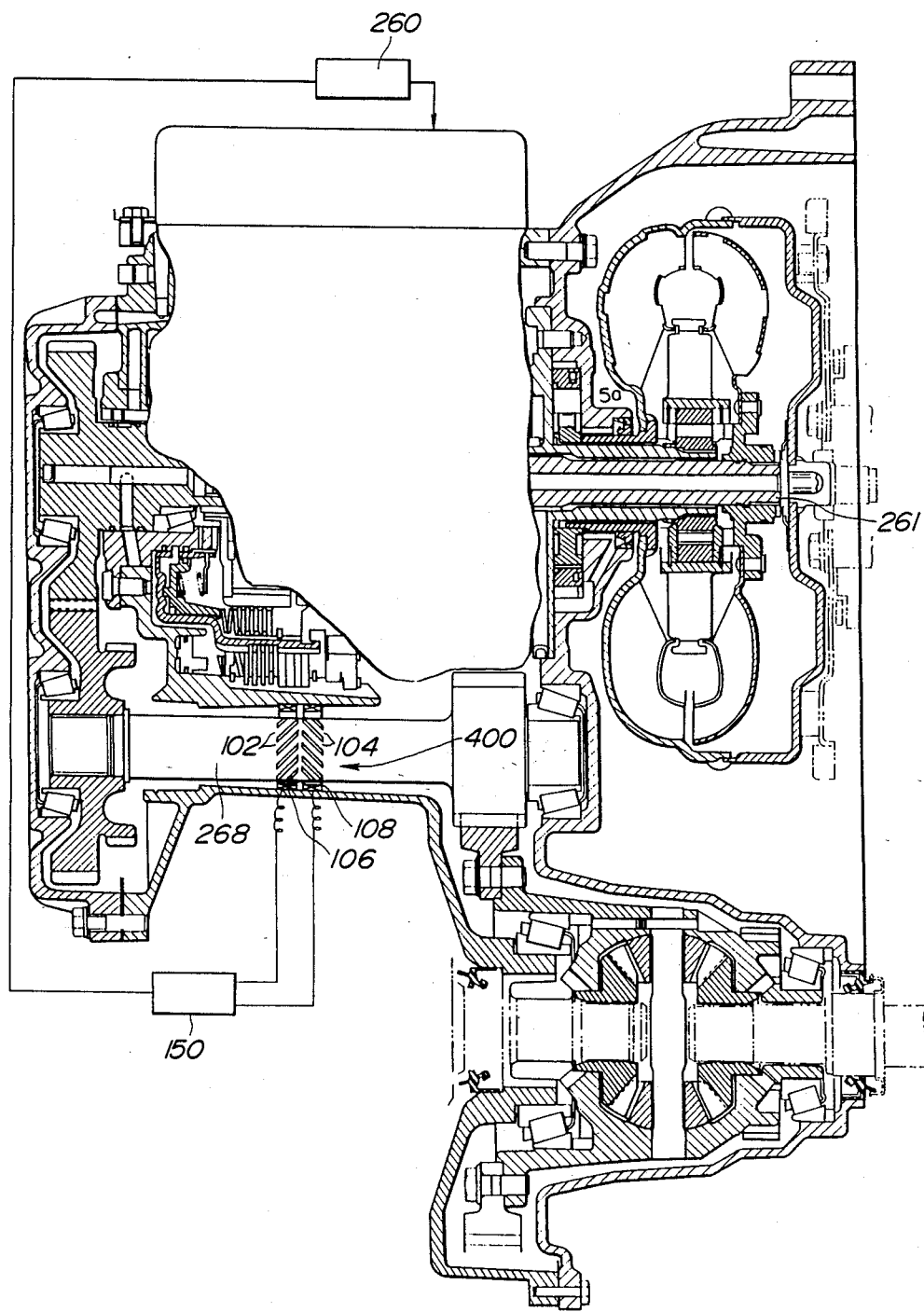
FIG. 11 is a sectional view of the fourth embodiment of the invention.

As the construction, arrangement and operation of automatic transmissions of the nature shown in FIGS. 9 and 11 are well known and the type of transmission to which the inventive sensor arrangement is not limited to the same no further disclosure relating to the same will be given for brevity.

THIRD EMBODIMENT

Figure 10:
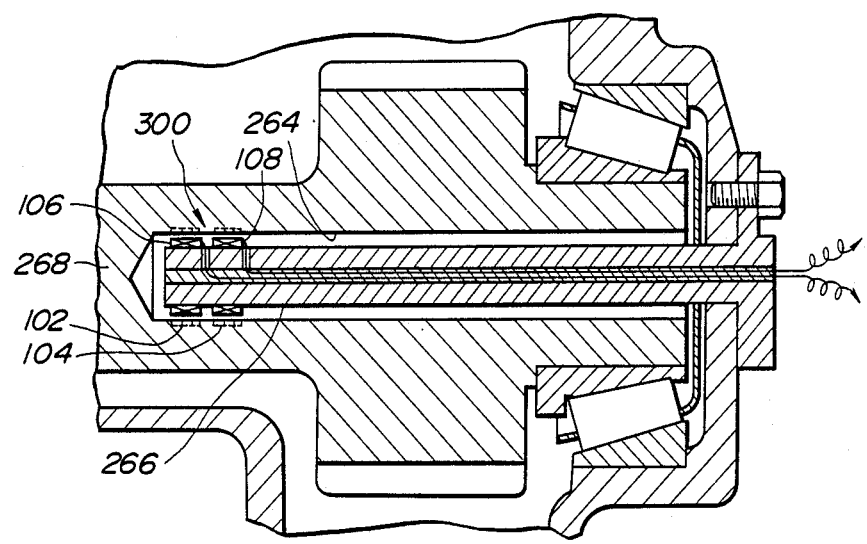
FIG. 10 is a sectional view showing a third embodiment of the present invention.

FIG. 10 shows the arrangement which characterizes a third embodiment of the present invention. The sensor 300 which is used in this embodiment is disposed in a blind bore 264 formed in one end of a counter or pinion reduction shaft 262 of the transmission. The first and second sets of grooves 102, 104 are formed in the wall of the bore proximate the closed end thereof.

In the illustrated embodiment the bobbin like supports in which the coils are disposed and which define the yokes are omitted and the coils 106, 108 directly secured to the surface of the probe-like member 266 which is disposed through the bore 264.

In this arrangement the probe-like member 266 is secured to the transmission casing by a bolt.

It is of course within the scope of the present invention to provide radial extending flanges (yokes) on either side of the coils if so desired.

A feature of this arrangement comes in its relatively easy replacemement and repair. Viz., as will be appreciated from FIG. 9 the location in which the third embodiment is disposed is accessible from outside of the transmission and repair of the same does not require disassembly of the transmission per se.

FOURTH EMBODIMENT

FIG. 11 shows a fourth embodiment of the present invention. In this arrangement the sensor 400 is disposed about the transmission counter shaft 268. In this arrangement the first and second sets of grooves 102, 104 are formed in the external surface of the counter shaft 268 proximate the mid-section thereof. The coils 106, 108 which define the second portion of the sensor are disposed on the walls of a tunnel-like section of the transmission housing through which the counter shaft 268 is disposed.

A feature common with the third and fourth embodiments comes in that as the length of the shaft 268 in which the grooves 102, 104 are formed is relatively long and is operatively connected with the input shaft and the differential gear of the transaxle by way of gears, the amount of flexure which occurs is relatively large magnifying the change in the amount of magnetic flux which passes through the projections I and II. This of course increases the dynamic range and accuracy of the device.

What is claimed is:

1. An automotive transmission comprising:
a gear train, said gear train being enclosed in a housing;
a rotatable shaft, said shaft forming part of said gear train, said shaft being enclosed within said housing;
means defining a first set of grooves in a surface of said shaft, said first grooves defining a plurality of first projections therebetween, said first grooves and said first projections being arranged at a first angle with respect to the axis of rotation of said shaft, said first projections undergoing one of compression and elongation when a torque is applied to said shaft;
a first coil, said first coil being mounted so as to juxtapose said first set of grooves, said first coil being operatively connected with a control circuit which includes a source of alternating current;
means defining a second set of grooves in said surface of said shaft, said second set of grooves defining a plurality of second projections which are arranged at a second predetermined angle with respect to the axis of rotation of said shaft, said second projections undergoing the other of compression and elongation when torque is applied to said shaft; and
a second coil, said second coil being mounted so as to juxtapose said second set of grooves, said second coil being connected with said control circuit;
wherein said first and second projections are arranged to be magnetically permeable so that when subject to compression the permeability is reduced and the amount of magnetic flux which passes therethrough is reduced, and when subject to elongation the permeability is increased and the amount of magnetic flux which passes therethrough is increased.

2. A transmission as claimed in claim 1 wherein said control circuit includes a bridge circuit which is operatively connected with said source of alternating current, said first and second coils defining first and second resistances of said bridge circuit, said bridge circuit further including first and second fixed resistances, said first and second fixed resistances being selected to balance said bridge circuit when no torque is applied to said rotatably body.

3. A transmission as claimed in claim 1 wherein said first and second coils are disposed on the inner periphery of a tube-like member which surrounds said shaft.

4. A transmission as claimed in claim 3 wherein said tube-like member is formed on a clutch housing in which a friction clutch is disposed, said tube-like member extending into said clutch housing and having a clutch release bearing disposed on the external surface thereof.

5. A transmission as claimed in claim 3 wherein said tube-like member comprises a sleeve on which the a torque converter is supported.

6. A transmission as claimed in claim 1 wherein said first and second coils are supported on a probe-like member which is disposed in a bore formed in said shaft, said first and second sets of grooves being defined on the wall of said bore.

7. A transmission as claimed in claim 1 wherein said first and second sets of grooves are defined in the same surface of said rotatably body and in a manner to define a mirror image relationship.

8. A transmission as claimed in claim 1 further comprising first and second bobbins, said first and second bobbins respectively supporting said first and second coils, said first and second bobbins having radially extending flanges which extend along each side of each of the coils, said radially extending flanges acting as yokes which extend towards and juxapose said shaft.

9. A transmission as claimed in claim 1 wherein said shaft comprises a counter shaft which operatively interconnects an output gear of said transmission with a differential gear.

10. In an automotive power train
a transmission comprising:
clutch means;

a gear train, said gear train being operatively connected with the output shaft of a prime mover by way of said clutch means;

a rotatable shaft, said rotatable shaft forming part of said gear train;

casing means for housing said clutch means and said gear train, said casing means having a portion in which said shaft is rotatably supported, said casing means enclosing said shaft therewithin;

means defining a first set of grooves in a surface of said shaft, said first set of grooves being so constructed and arranged as to define a plurality of magnetically permeable first projections therebetween, said first projections being arranged at a first angle with respect to the axis of rotation of said shaft, said first projections undergoing one of compression and elongation when a torque is applied to said shaft;

means defining a second set of grooves in said surface, said second set of grooves being so constructed and arranged as to define a plurality of magnetically permeable second projections therebetween, said second projections being arranged at a second angle with respect to the axis of rotation of said shaft, said second projections undergoing the other of compression and elongation when a torque is applied to said shaft;

first and second coils, said first and second coils being mounted so as to juxtapose said first and second sets of projections, respectively.

11. In an automotive power train
a transmission comprising:
a torque converter;
a gear train, said gear train being operatively connected with the output shaft of a prime mover by way of said clutch;
a rotatable shaft, said rotatable shaft forming part of said gear train;
casing means for housing said torque converter and said gear train, said casing means having a portion in which said shaft is rotatably supported, said casing means having a tubular-like extension through which said shaft is disposed, said tubular-like extension supporting a part of said torque converter;
means defining a first set of grooves in a surface of a portion of said shaft which is located within said tubular extension, said first set of grooves being so constructed and arranged as to define a plurality of magnetically permeable first projections therebetween, said first projections being arranged at a first angle with respect to the axis of rotation of said shaft, said first projections undergoing one of compression and elongation when a torque is applied to said shaft;
means defining a second set of grooves in said surface, said second set of grooves being so constructed and arranged as to define a plurality of magnetically permeable second projections therebetween, said second projections being arranged at a second angle with respect to the axis of rotation of said shaft, said second projections undergoing the other of compression and elongation when a torque is applied to said shaft;
first and second coils being disposed within said tubular-like extension and arranged to juxtapose said first and second sets of projections, respectively.

12. In an automotive power train
a transmission comprising:
a transmission gear train, said gear train having a power input shaft;
a clutch, said clutch selectively providing a drive connection between said power input shaft and a power output shaft of a prime mover;
casing means for housing said clutch and said gear train, said casing means having a tubular-like extension through which said shaft is disposed, said tubular-like extension supporting a bearing element of said clutch;
means defining a first set of grooves in a surface of a portion of said shaft which is located within said tubular extension, said first set of grooves being so constructed and arranged as to define a plurality of magnetically permeable first projections therebetween, said first projections being arranged at a first angle with respect to the axis of rotation of said shaft, said first projections undergoing one of compression and elongation when a torque is applied to said shaft;
means defining a second set of grooves in said surface, said second set of grooves being so constructed and arranged as to define a plurality of magnetically permeable second projections therebetween, said second projections being arranged at a second angle with respect to the axis of rotation of said shaft, said second projections undergoing the other of compression and elongation when a torque is applied to said shaft;
first and second coils, said first and second coils being disposed within said tubular-like extension and arranged to juxtapose said first and second sets of projections, respectively.

13. In a automotive power train
a transmission comprising:
clutch means;
a gear train, said gear train being operatively connected with the ouput shaft of a prime mover by way of said clutch means;
a rotatable shaft, said rotatable shaft forming part of said gear train;
casing means for housing said clutch means and said gear train, said casing means enclosing said shaft therewithin;
a bearing, said bearing being supported by said casing means and rotatably supporting one end of said rotatable shaft;
means defining a bore in said shaft, said bore extending from said one end of said shaft;
means defining a first set of grooves in a surface of said bore, said first set of grooves being so constructed and arranged as to define a plurality of magnetically permeable first projections therebetween, said first projections being arranged at a first angle with respect to the axis of rotation of said shaft, said first projections undergoing one of compression and elongation when a torque is applied to said shaft;
means defining a second set of grooves in said surface, said second set of grooves being so constructed and arranged as to define a plurality of magnetically permeable second projections therebetween, said second projections being arranged at a second angle with respect to the axis of rotation of said shaft, said second projections undergoing the other of compression and elongation when a torque is applied to said shaft;

a probe-like member, said probe like member being connected to said casing means and arranged to project into said bore;

first and second coils, said first and second coils being mounted on said probe-like member so as to juxtapose said first and second sets of projections, respectively.

14. In a automotive power train a transmission comprising:

clutch means;

a gear train, said gear train being operatively connected with the output shaft of a prime mover by way of said clutch means, said gear train having an output gear;

a differential gear, said differential having an input gear;

casing means for housing said clutch means, said gear train and said differential gear;

a rotatable shaft, said rotatable shaft being supported in said casing means and providing a drive connection between the output of said gear train and the input gear of said differential gear, said casing means defining a passage structure which extends about a portion of said rotatable shaft;

means defining a first set of grooves in a surface of said portion of said rotatable shaft, said first set of grooves being so constructed and arranged as to define a plurality of magnetically permeable first projections therebetween, said first projections being arranged at a first angle with respect to the axis of rotation of said shaft, said first projections undergoing one of compression and elongation when a torque is applied to said shaft;

means defining a second set of grooves in said surface, said second set of grooves being so constructed and arranged as to define a plurality of magnetically permeable second projections therebetween, said second projections being arranged at a second angle with respect to the axis of rotation of said shaft, said second projections undergoing the other of compression and elongation when a torque is applied to said shaft;

first and second coils, said first and second coils being disposed in said passage structure so as to juxtapose said first and second sets of projections, respectively.

* * * * *